(12) United States Patent  (10) Patent No.: US 8,256,323 B2
Vellutini                    (45) Date of Patent: Sep. 4, 2012

(54) CONTROL DEVICE WITH THUMB TRIGGER

(76) Inventor: Frederic Vellutini, Ajaccio (FR)

(*) Notice: Subject to any disclaimer, the term of this patent is extended or adjusted under 35 U.S.C. 154(b) by 586 days.

(21) Appl. No.: 12/446,247

(22) PCT Filed: Oct. 17, 2007

(86) PCT No.: PCT/FR2007/052194
§ 371 (c)(1),
(2), (4) Date: Apr. 20, 2009

(87) PCT Pub. No.: WO2008/047056
PCT Pub. Date: Apr. 24, 2008

(65) Prior Publication Data
US 2010/0313696 A1  Dec. 16, 2010

(30) Foreign Application Priority Data
Oct. 19, 2006 (FR) ...................... 06 09161

(51) Int. Cl.
G05G 7/00 (2006.01)
G05G 1/04 (2006.01)
G05G 1/06 (2006.01)
(52) U.S. Cl. ........................ 74/502.2; 74/488
(58) Field of Classification Search ............... 74/502.2, 74/489, 488
See application file for complete search history.

(56) References Cited

U.S. PATENT DOCUMENTS

| 6,095,309 A | 8/2000 | Mione |
| 2003/0944064 | 5/2003 | Dal Pra' |
| 2003/0213331 A1 | 11/2003 | Croft |
| 2005/0223839 A1* | 10/2005 | Crabtree ............ 74/502.2 |
| 2006/0070479 A1* | 4/2006 | Ose ............ 74/502.2 |
| 2007/0186715 A1 | 8/2007 | Dal Pra' |

FOREIGN PATENT DOCUMENTS

| EP | 1 312 541 | 5/2003 |
| FR | 339 568 | 6/1904 |
| FR | 835 778 | 12/1938 |
| FR | 2 654 698 | 5/1991 |
| WO | 95 07836 | 3/1995 |
| WO | 00 29280 | 5/2000 |
| WO | 2006 091197 | 8/2006 |

* cited by examiner

Primary Examiner — Troy Chambers
Assistant Examiner — Terence Boes
(74) Attorney, Agent, or Firm — Oblon, Spivak, McClelland, Maier & Neustadt, L.L.P.

(57) ABSTRACT

A manual control device including a handle configured to be grasped by a hand with a thumb, and a trigger configured to be subjected to a pressure from the distal phalanx of the thumb. The trigger is placed relative to the handle so as to be able to be subjected to a pressure from the distal phalanx while the proximal phalanx from the thumb is resting along the handle.

16 Claims, 13 Drawing Sheets

CONTROL DEVICE WITH THUMB TRIGGER

BACKGROUND OF THE INVENTION

1. Field of the Invention

The present invention relates to the field of devices for manually controlling a machine, coupled with a handle making it possible to grasp the machine. In particular, the device makes it possible to control sensitively and without fatigue a control device of one of the controlled systems of this machine.

2. Description of the Related Art

A considerable grasping force with the hand on the handle of a machine is usually necessary to allow a correct holding of the machine and its use in total safety. It is difficult to reconcile a vigorous grasping of a handle of a machine with at the same time exerting a coupled control on this handle.

Certain machines have a handle for holding the machine. This is the case with portable tools such as drills, brushclearers, pneumatic drills or chainsaws. In other machines, such as motorcycles, the handle or handles are used to hold the machine. Finally there are other machines such as quad bikes, jet skis or snowmobiles, the handles of which allow the driver and user to keep himself on the machine. All these types of machines require a vigorous grasp of one or more handles.

Furthermore, certain controlled systems may be controlled occasionally at the time of a change of setpoint. This is the case for example with gearbox controls. The hand of the user is then required only occasionally, in order to control the machine. It may be permissible for the hand to slightly weaken its grip on the machine during the occasional control operation.

On the other hand, other controlled systems require being controlled continuously or virtually all the time such as controls of a carburetor or of the speed of an electric motor. A particular problem arises for manual controls that have to be actuated for a long time from a firmly grasped handle. It is necessary to reduce the risk of cramp in the muscles of the hand acted upon for the actuation of the control.

The problem of compatibility with a vigorous grasp also arises for the control of systems requiring a fine metering of the setpoint. When a new setpoint must be adapted to the reaction of the machine, the hand must be able to meter the force exerted and/or the movement of a control device.

The problem of compatibility with a firm grasp also arises for the control of a system requiring a rapid reaction from the user of the machine.

The problem of compatibility with a firm grasp arises when the action of the hand is required for a long time, even if the control of the system also has periods of inactivity. Similarly, control systems comprising means for sampling the setpoint also pose a problem of effective grasp since the hand continues to act between two samples of this setpoint.

In the field of manually controlled devices coupled with a handle making it possible to firmly grasp a machine, there are notably the handles fitted to the end of a handlebar. The two handles require a considerable grasp.

The control of a controlled system on one of these handles usually causes a grasp defect because it requires either the use of one or more fingers or that of the wrist, thereby causing an imbalance with the opposite handle. This imbalance may be relatively dangerous because it affects the gripping of the handlebar and therefore the capacity to hold oneself and to steer the machine. The system of control on the handle must also allow a precise control that is not tiring over time.

There are several types of controls coupled to handles which require either a rotation of the wrist or the detachment from the handle of one or more fingers in order to actuate the control. The most conventional controls mounted on a handle usually operate controlled systems such as throttle, brake, clutch or gearbox ratio controls.

The brake controls mounted on vehicles, for example, most frequently use an articulated lever positioned in front of the handle. This lever is usually actuated by one or more of the fingers (index finger, middle finger, ring finger, little finger) which, by closing, apply a pressure to the lever, creating via a hydraulic system a pressure which operates the braking system.

For motorcycles, there is usually a control handle device which makes it possible to operate the throttle control. This system consists of a rotary handle winding a cable which operates a throttle valve. In order to carry out this control in rotation, it is possible to leave all the fingers tight on the handle allowing a correct grasping of the latter but it is necessary to permanently bend, and sometimes do so considerably, the wrist in order to generate the control. Usually, the rest position of the control corresponds to the natural position of the wrist. The control is generated by carrying out a flexing of the wrist up to the physiological limit of the wrist. This continuous flexing of the wrist causes evident discomfort and generates an imbalance with the opposite arm which for its part keeps its wrist in a natural and non-tiring position. In addition, the flexing of the wrist physiologically affects the capacity of flexing extension of the fingers and hence the grip. Therefore, an increase in the flexing of the wrist, generating an increase in the control, not only increases the difficulty of driving the vehicle but also reduces the ability to hold and even more to grasp. In summary, the more the user accelerates and goes fast, the poorer the position of the wrist and the grip. Furthermore, during accelerations of the vehicle, by seeking to hold on more firmly, the user naturally tends to turn the handle even further and therefore to increase the acceleration of the machine which is quite dangerous.

On quad bikes, there is usually found, as a type of control coupled to a handle, a system of a rotary trigger actuated by a pressure from the thumb. This rotary trigger is usually attached to the handlebar behind the handle. It moves along a horizontal plane passing through the thumb and positioned slightly beneath the handle. In order to actuate it, it is necessary to remove the thumb from the handle, move it back toward the trigger and press it against the latter. This gives a good grip of the control device with the thumb and the possibility of correctly controlling the control device because of the use of the thumb. Nevertheless, this system has two major disadvantages. First, this control device requires a movement and a lateral extension of the thumb which is relatively painful in the long term. This lateral movement from front to rear of the thumb prevents its proximal phalanx from remaining in permanent contact with the handle and therefore participating in gripping the handle. If the proximal phalanx remains in contact with the handle it is no longer possible to carry out the control because the digit no longer has enough degrees of freedom. During control of the trigger, the gripping is left to the remaining digits (index finger, middle finger, ring finger, little finger) which increase their gripping effort in order to maintain a correct grasp, despite the loss of this essential digit, causing rapid fatigue of these digits and even cramps. Also, with this type of trigger, there is an imbalance of grip between the handle grasped by all the digits including the thumb and that grasped by all the digits except the thumb, causing an imbalance of the handlebar. These imbalances of hold and of steering are the main disadvantages of such a system.

On jet skis, the throttle is usually controlled by a small lever also called a trigger articulated in front of the handle and actuated by pulling it with the index finger. It is thus possible to firmly hold the handle with the thumb underneath, allowing a better grip than the trigger but the user loses the use of the index finger that is occupied in managing the control and that no longer participates in the grip of the handle. This loss of the index finger makes it necessary to increase the effort on the other digits (middle finger, ring finger, little finger) in order to compensate for the imbalance of effort with the other handle which for its part has all these digits for the grip. In addition, the index finger not being the strongest finger for actuating a control which is sometimes hard, there is therefore often a premature fatigue of the muscles of the index finger and even cramps. The little finger, because of its small muscular capability, does not participate significantly in the grip. Only the middle finger and the ring finger then participate in the grip of the upper portion of the handle, which is clearly insufficient. This trigger device causes a general increase in the fatigue of the fingers either due to the management of the control device or due to an increase in the gripping effort. There is also the problem of imbalance between the handle using all the fingers for the grip and that which uses only some of them, again causing a problem of holding the handlebar and of operating the steering.

There are also systems of controls coupled to a handle on portable tools which often use control methods similar to those mentioned above. On certain tools also using a handlebar, there are the same problems as those mentioned for vehicles. On the tools, there are handles that include a trigger of the joystick or firearm type. When the tool is gripped, the user squeezes the trigger and operates the control. If the user no longer desires to operate the control, he has to release the grip by opening one or more fingers, causing a weaker grip.

Patent application WO 2006/091 197 describes a trip lever for a bicycle. The device described comprises a ratchet mechanism between the handle and the trip lever. To act on the lever, the user must open the thumb, stop gripping the handle with the thumb, and draw the thumb downward in order to reach the lever. After actuating the lever, gripping the handle is again possible when the thumb has left the lever.

Application EP 1 312 541 describes a gear change device for a bicycle. Here again, the cyclist must raise the thumb and separate it from the handle in order to reach the gear lever. A disadvantage that is common to the levers described in both of the above patent applications is that the actuation of the control device is accompanied by a weakening of the grip of the handle. In addition, the type of lever is an occasional control system and does not make it possible to control continuous control systems.

BRIEF SUMMARY OF THE INVENTION

The invention proposes a manual control device comprising a handle for grasping a machine which remedies at least one of the above disadvantages. One object of the invention is to allow a good grasp of the handle while making it possible to control a controlled system of the machine, and in particular a system of continuous control.

According to one embodiment, the manual control device comprises a handle designed to be grasped by a hand with a thumb. The device comprises a trigger designed to be subjected to a pressure from the distal phalanx of the thumb. The trigger is placed relative to the handle so as to be able to be subjected to a pressure from the distal phalanx while the proximal phalanx of said thumb is resting along the handle. The feature of position of the trigger relative to the handle is defined while considering an average hand of a user of the machine, also called a reference hand.

In such a device, because the proximal phalanx of the thumb can reach a trigger without forcing the proximal phalanx of the thumb to be separated from the handle it is possible to provide a firm grasp of the handle, while allowing the distal phalanx to act on the trigger in order to control a system. In other words, the contact of the proximal phalanx on the handle, during the action of the middle point, makes it possible to grip the handle between the proximal phalanx and the other fingers while leaving free action to the distal phalanx.

Advantageously, the trigger comprises a pressure end, said pressure end in the rest position being situated at least partly opposite the internal face of the distal phalanx of said thumb in extension, the proximal phalanx of said thumb resting along the handle. The grasp of the handle remains optimal because the proximal phalanx of the thumb is short and the corresponding muscles are strong. Using the distal phalanx of the thumb to control a system allows a more sensitive control than controls using the action of the index finger of the hand, for example. This is because the thumb is the digit of the hand that is both the strongest and the most subtle because it is controlled by eight muscles.

Advantageously, the trigger is placed so as to be actuated by a thumb resting on the handle via an internal lateral side of the proximal phalanx. The proximal phalanx/distal phalanx reference plane of a thumb is defined as being the midplane in which the proximal phalanx and the distal phalanx move naturally. "Internal face" and "external face" of a thumb mean the faces the normals of which are in the reference plane. "Lateral sides" of a thumb means the sides the normals of which are substantially perpendicular to the reference plane. The internal lateral side is that which is opposite to the other digits of the hand.

The muscles allowing the movement of the distal phalanx are mainly situated on the internal and external faces of the proximal phalanx. The lateral side of the proximal phalanx of the thumb comprises no muscle for actuating the distal phalanx. Therefore the muscles of the palm of the hand can pull the proximal phalanx so that the hand firmly grips the handle without stressing the muscles for actuating the distal phalanx. The distal phalanx can act on the trigger with a weak effort and for a long period without requiring the proximal phalanx to relax its tight grip on the handle by the proximal phalanx. The muscular contractions of the hand and of the arm due to the grasping are decoupled from the contraction of the muscles for actuating the distal phalanx. Therefore, the control of the trigger remains sensitive and is not tiring despite the efforts for grasping the handle. This makes it possible to control continuous control systems.

According to one embodiment, the handle is laid along an axis of the handle, the device has a reference plane parallel to an axis of the handle in which the proximal phalanx can move resting along the handle and the distal phalanx of the thumb.

According to one embodiment, the handle is laid along an axis of the handle, the device comprising reference hand grasping prepositioning means, such that a proximal phalanx/distal phalanx reference plane has a gripping angle (B) relative to the axis of the handle that is less than 50 degrees and preferably less than 25 degrees.

Advantageously, the grasping prepositioning means are such that a metacarpal midplane is substantially parallel to the axis of the handle.

According to one embodiment, the prepositioning means have a main grasping position, a main reference plane and a main position of extension of the thumb of said reference hand.

One advantage of this device lies in the fact that it makes it possible to keep the proximal phalanx of the thumb resting permanently on the handle while using the natural movement of the distal phalanx and/or of the proximal phalanx around their respective articulations in order to carry out the control.

The position of the reference plane relative to the handle is notably a function of the shape and dimension of the cross section of the handle at the location of gripping between the proximal phalanx, the palm and the index finger. In one variant, this cross section may be of sufficiently reduced dimension for the proximal phalanx to grip the handle and the proximal phalanx/distal phalanx reference plane to be parallel to the metacarpal plane defined by the metacarpi of the other digits and parallel to the axis of the handle. In this case, the thumb metacarpus is not in the optimum pincer position, but is raised on the side of the hand. In another variant, the means for prepositioning the hand are such that the metacarpal plane is slightly inclined relative to the axis of the handle so that the proximal phalanx grips the handle while the thumb metacarpus is in the natural pincer position and the proximal phalanx/distal phalanx reference plane is parallel to the axis of the handle.

According to another embodiment, the device has several positions for grasping the handle and in which the trigger comprises a thrust part extending around the handle so that in each grasping position, the end of the distal phalanx is opposite the thrust part.

In the case of motocross or jet ski, the rider must be able to firmly grip the machine in several positions both seated and standing on the machine. In the seated position, the forearm of the user is horizontal. In the standing position, this forearm is raised. The natural grasp on the handle corresponds to a position in which the metacarpi of the hand are in the extension of the forearm. The handle has a substantially horizontal reference plane corresponding to the seated position, and an inclined reference plane corresponding to a standing position. The fact that the thrust part extends around the handle makes it possible that, irrespective of the position of the proximal phalanx of the thumb, between the seated and/or standing positions, the distal phalanx always finds opposite its end a portion of the thrust part.

According to one variant, the handle has a substantially flat bearing zone designed to receive the proximal phalanx during the control action.

When the handle has a main reference plane corresponding to a majority grasping position, the bearing zone that is flat, or substantially suited to the morphology of the proximal phalanx, makes it possible to reduce the bearing pressure. This facilitates the optional sliding of the proximal phalanx along this bearing zone during the possible trajectory for actuating the trigger.

According to one embodiment, the trigger can be moved between a rest position and an extreme actuation position.

The natural closure of the thumb on the other digits is used to carry out the control action. During this closure of the thumb, the proximal phalanx of the thumb turns around its natural articulation and, irrespective of the phase of control of the trigger, remains permanently resting on the handle unlike the conventional trigger control systems. This particular feature of positioning of the proximal phalanx during the control phase is essential because it is that which allows the constant grip by its opposition to the other digits throughout the control action. This closure of the thumb generates a movement of the distal phalanx and/or of the proximal phalanx toward the index finger while always having the proximal phalanx of the thumb permanently pressing against the handle.

According to one embodiment, the trigger can be moved about an axis of rotation situated so that the pressure end of the trigger describes an arc of a circle corresponding to the arc of a circle described by the distal phalanx during the control action.

According to one embodiment, the trigger can be moved about an axis of rotation inclined relative to the normal to the main reference plane through an angle (A) of less than 30 degrees.

According to a variant, the device comprises a trigger stop such that the extreme actuation position is limited by the complete closure of the fist and the resting of the trigger on the index finger.

In other words, the trigger may be movable so that, in the rest position, its end is placed resting against the distal phalanx of the thumb in extension, and its movement, under the effect of the pressure exerted by the thumb, makes it possible to carry out a control action the limit of which will be defined by the complete closure of the fist and the resting of the trigger on the index finger.

Advantageously, the device comprises a return system allowing the automatic return of the trigger to its rest position when it is no longer acted upon.

According to another embodiment, the trigger is fixed relative to the handle.

Advantageously, one or more sensors may provide information characteristic of the force applied by the thumb to the trigger used to generate the control action.

According to a variant, a trigger support may position the trigger relative to the handle.

According to one embodiment, the trigger support is incorporated into the handle.

Advantageously, a trigger support or the trigger has one or more adjustment systems allowing an ergonomic positioning of the trigger relative to the thumb.

Advantageously, the thrust part of the trigger has a non-slip shape and/or coating. The thrust part may allow good adhesion generating a reliable contact of the distal phalanx on the trigger end in order to prevent any slipping of the latter.

According to one embodiment, the handle is furnished with an external hand arrestor and/or an internal hand arrestor.

According to variants, the device may comprise at least one control setpoint generator taken from a mechanical connecting part, an analog or digital sensor of the position of the trigger, or an analog or digital sensor of the force exerted on the trigger. In other words, the controlled system may be operated in a purely mechanical manner and/or thanks to one or more items of analog or digital information on the position of the trigger or on the force applied to the latter. The trigger may mechanically operate the controlled system via a connecting part which is for example adjustable on the trigger.

According to another aspect, the invention also relates to a machine fitted with a manual control device, wherein the handle allows the grasping of the machine by a user, the handle being positioned relative to the user so that the pressure end of the trigger is situated at least partly in front of the handle.

According to another aspect, the invention also relates to use of a manual control device for grasping a machine and simultaneously controlling one of the systems for controlling the machine, said grasping of the machine being done with a gripping of all the fingers of the hand on the handle during the actuation of the control device with the thumb of the same hand.

Advantageously, the controlled system is operated mechanically, for example via a connecting part that is adjustable on the trigger.

Alternatively or in addition, the controlled system is operated thanks to one or more items of analog or digital information on the position of the trigger or on the force applied to the latter.

According to one aspect, the invention also relates to a thumb trigger control device, coupled to a handle making it possible to grasp a machine, and to control in a sensitive and non-tiring manner a control device of one of the controlled systems of this machine, while providing an optimal grip thanks to the permanent and natural contact of all the fingers on the handle.

The device comprises a handle, fitted with a trigger one end of which, positioned in front of the handle and the internal face of the distal phalanx of the thumb, is subjected to a pressure from the latter in order to generate a control action making it possible to operate the controlled system, via a mechanical connection and/or one or more digital or analog items of information, while allowing a movement in a reference plane parallel to the axis of the handle, of the distal phalanx and of the proximal phalanx of the thumb which, by its permanent pressure along the handle, ensures an optimal grasp of the latter. In other words, the device may have a reference plane parallel to the axis of the handle in which the proximal phalanx can move resting along the handle and the distal phalanx of the thumb.

BRIEF DESCRIPTION OF THE DRAWINGS

Other features and advantages of the invention will appear on reading the detailed description of a number of embodiments taken as nonlimiting examples and illustrated by the appended drawings in which.

DETAILED DESCRIPTION OF THE INVENTION

Figure 1:
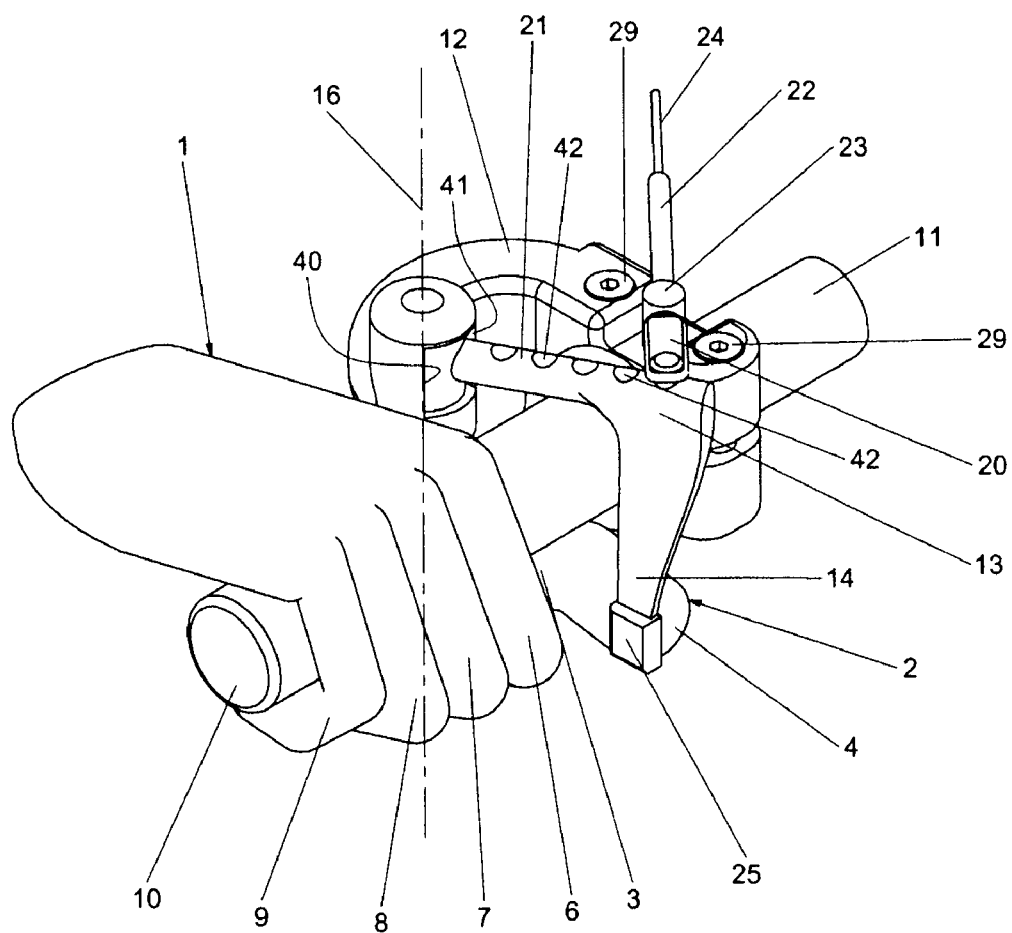
FIG. 1 represents in perspective a first embodiment of the device in the rest position.

In all the figures, the references bearing the same numbers relate to corresponding elements having similar functions. As illustrated in FIGS. 1 to 5, the first embodiment of the device comprises a handle 10, grasped by a hand 1 and clutched by the index finger 6, the middle finger 7, the ring finger 8 and the little finger 9. The thumb 2 is for its part placed under the handle 10, its proximal phalanx 3 resting on the latter, thereby gripping it. The handle 10 is fixed to a handle support 11. The handle support 11 may be a handlebar or a steering wheel.

A trigger support 12 is fixed to the handle support 11 thanks to two screws 29. A trigger 13 can be moved on the trigger support 12 by articulating about a virtual axis 16 close to the articulation of the thumb 5. This trigger 13 is furnished with attachments 21 onto one of which a connecting part 20 is attached. A cable 24 allowing the operation of a controlled system is fixed to this connecting part 20 and slides in a sleeve 22, attached to the trigger support 12 with the aid of a sleeve arrestor 23. The end 14 of the trigger 13 is furnished with a pressure part 25 and is placed, in the rest position, in front of the internal face of the distal phalanx 4 of the thumb 2 which keeps its proximal phalanx 3 resting on the handle 10.

To carry out a control action, the thumb 2 is closed on the index finger 6 while keeping the proximal phalanx 3 resting on the handle 10 and the distal phalanx 4 resting on the pressure part 25. The movement of the proximal phalanx 3 and of the distal phalanx 4 is made in a reference plane 18. The pressure of the distal phalanx 4 on the pressure part 25 causes the trigger 13 to rotate about a virtual axis 16. A travel 19 of the trigger 13 is limited by a rest stop 40 and an extreme travel stop 41. It causes a movement of the connecting part 20 which causes the cable 24 in the sleeve 22 to slide, making it possible to operate a controlled system.

The trigger 13 is fixed to the trigger support 12 which may also be fixed to the handle 10. The trigger support 12 may also be incorporated into the handle 10.

The trigger support makes it possible to fix the trigger 13 relative to the handle 10. It may also allow a positioning that is lateral and in rotation relative to the handle 10 in order to adapt the position of the trigger end 14. The trigger is articulated on the support 12 thanks to a physical shaft or a virtual axis 16. The virtual axis 16 may be produced thanks to the relative rotation of a circular form of the trigger 13 relative to another circular form of the trigger support 12.

It is possible to carry out an ergonomic adjustment of the end 14 of the trigger in order to adapt it to each user. It is also possible for this purpose to use the screws 29 which give a degree of freedom to the trigger support. The device may also include additional adjustment systems. These systems may be incorporated into the handle 10, into the handle support 12 or into the trigger 13. It is also possible to provide an interchangeable trigger 13 in order to adapt to the user.

The trigger 13 may be movable relative to the handle 10 in several ways, either by being articulated about an axis 16 or by translating in one direction, or by combining these two movements.

When operating a system controlled in a purely mechanical manner, it is possible to fix to the trigger a connecting part 20 which makes it possible to transmit the movement of the trigger 13 to the controlled system. This connecting part 20, as an example, may be connected to a cable, a bar or a rod which will operate the controlled system. It is also possible to use a hydraulic or pneumatic system in order to operate the controlled system. The trigger is connected, via the connecting part 20, to a piston or to another device making it possible to convert the force exerted on the trigger 13 into a pressure and to operate the controlled system. A set of attachments 42 may allow an adjustment of the connecting part 20 along the trigger 13 in order to create a gearing effect, of the force and/or of the movement, between the trigger and the controlled system.

The human thumb is the digit of the hand which allows holding. It is the digit which makes the hand prehensile by being opposed to the other four digits. This transforms the hand into a pincer, into a support or into a movable claw. The thumb allows a correct holding of a handle the function of which is to allow an optimal grasp of an object. Simply holding is not always sufficient; a concept of force must also be added thereto because a handle may be used to firmly hold an apparatus or to keep oneself on a vehicle. This is called grasping rather than simply holding. Specifically, simply holding requires neither the presence of all the fingers on the handle, nor resultant muscular contractions. The presence of the thumb in contact with the handle allows a firm grasp.

The use of the thumb 2 to carry out the control action allows not only excellent, sensitive and very responsive control, but also, since it is the strongest digit, it often makes it possible to produce enough work to mechanically control a controlled system. Nevertheless the work that the thumb 2 can provide is limited and depends on the morphology of the user. If the work provided by the thumb 2 in order to operate the controlled system is not sufficient or is tiring over time, it is possible to use a real time system which provides a portion or all of the work, in order to correctly operate the controlled system. In the case of a real time system providing a portion of the work, it is necessary to keep the mechanical connection 20 between the trigger device and the controlled system. If the real time system provides all the work, it is no longer necessary to keep this mechanical connection 20 between the trigger 13 and the controlled system. Nevertheless this connection may be retained in order either to allow a backup solution in the event of failure of the real time system, or to allow the sensing of the response of the controlled system that is operated.

The pressure part 25 allows a good contact between the end of the trigger 13 and the thumb 2. The pressure part 25 has a shape or a coating conferring good adhesion between the thumb 2 and the end of the trigger 13 irrespective of the conditions of use. The trigger 13 and/or its end may also be covered in an anti-slip material. This is particularly useful in rain, in mud, in water for jet skis or if the hand is sweaty. The trigger may have an ergonomic shape, which may optionally be relatively complex, in order to provide a better fit for its user.

For safety reasons, it is also possible to have a trigger 13 that can deform under the effect of an impact so as not to injure the fingers of the user if there should be an impact with an external element.

Figure 2:
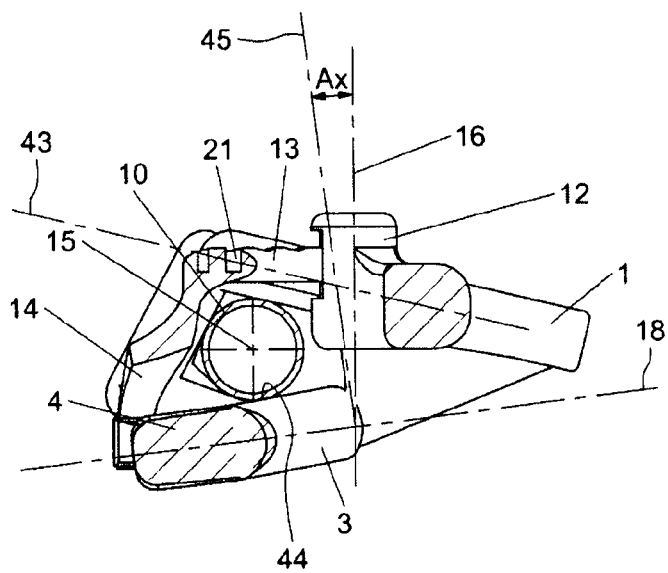
FIG. 2 is a front view of the first embodiment in the rest position.
Figure 3:
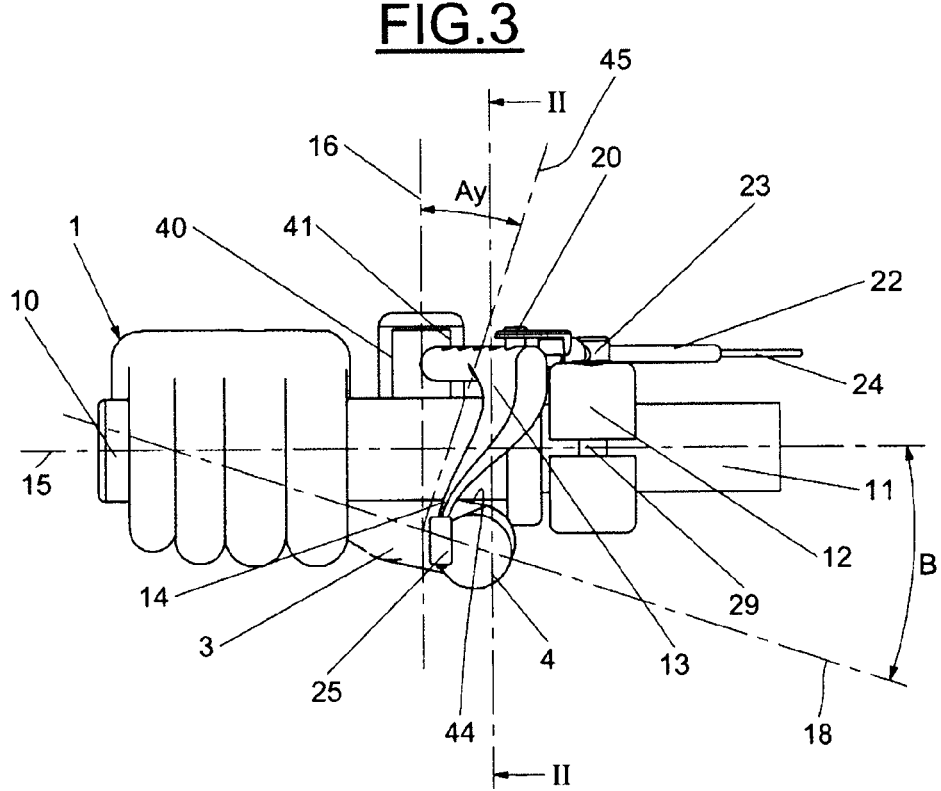
FIG. 3 is a cross section on the plane III-III of FIG. 2.

As illustrated in FIGS. 2 and 3, the hand has a palm resting on the handle. A metacarpal plane 43 is defined by the metacarpi of the hand 1. In this instance, it is tilted slightly upward. The proximal phalanx/distal phalanx reference plane 18 is tilted slightly downward. The pincer effect between the proximal phalanx 3 and the four fingers 6, 7, 8, 9 takes place in the natural extension of the forearm. If the handle is used in a jet ski, this main natural position may correspond to a seated position of the rider.

The handle 10 may comprise shapes closely hugging the palm and the fingers in this main position in order to make it easier to reposition the hand in one and the same main grasping position. The proximal phalanx/distal phalanx plane 18 corresponds to a main reference plane of the handle 10.

The axis 16 of rotation of the trigger 13 has an angle A relative to a normal 45 to the main reference plane 18. This angle A is less than 50°, and preferably less than 25°. It appears in projection Ax and Ay in FIGS. 2 and 3. The thumb 2 is resting on the handle 10 via its lateral side 44. The fact that the angle A is relatively small means that the lateral side 44 sustaining the grasping pressure is very slightly oriented toward the internal face of the proximal phalanx 3. Therefore, the muscles of the distal phalanx 4 are not hurt very much. The proximal phalanx/distal phalanx reference plane 18 may be parallel to the axis 15 of the handle 10. However, an angle B between the axis 15 and the reference plane 18 makes it possible to increase the force available for the grip.

When the thumb 2 is closed, the proximal phalanx 3 slides along a bearing surface 46 of the handle 10. The bearing surface 46 is substantially parallel to the axis 15 of the handle 10. Because of the angle B, the closure of the thumb 2 is accompanied by a slight separation of the proximal phalanx/metacarpus articulation of the thumb 2. This helps to increase the tightness of grip during the actuation of the trigger 13. The reference plane 18 moves slightly during the closure of the thumb 2, so that the position of the internal face of the distal phalanx 4 is a composite trajectory that is fairly close to a plane parallel to the axis 15 of the handle 10.

The axis of rotation 16 of the trigger 13 may pass through the natural articulation of the thumb. The positioning of the axis 16 allows the end 14 of the trigger 13 to be at all times in contact with the internal face of the distal phalanx 4 during the control phase. The axis 16 may be positioned as close as possible to the natural axis of rotation of the thumb so that the end of the trigger 13 describes an arc of a circle indistinguishable from the arc of a circle described by the distal phalanx 4 during the control action. The end 14 of the trigger 13, the distal phalanx 4 and the proximal phalanx 3 of the thumb 2 move in the same plane 18. The orientation of the axis of rotation 16 of the trigger 13 makes it possible, at the point of contact of the trigger 13 with the distal phalanx 4, and the thumb 2, to move in the reference plane 18. This allows the end 14 of the trigger 13 to follow the natural movement of the distal phalanx 4 of the thumb. This reduces the slipping of the distal phalanx 4 on the trigger 13, by superposing the movement of the end of the trigger 13 on that of the distal phalanx 4. The force of the thumb 2 on the trigger 13 is applied at a fixed point on the end of the latter.

Figure 4:
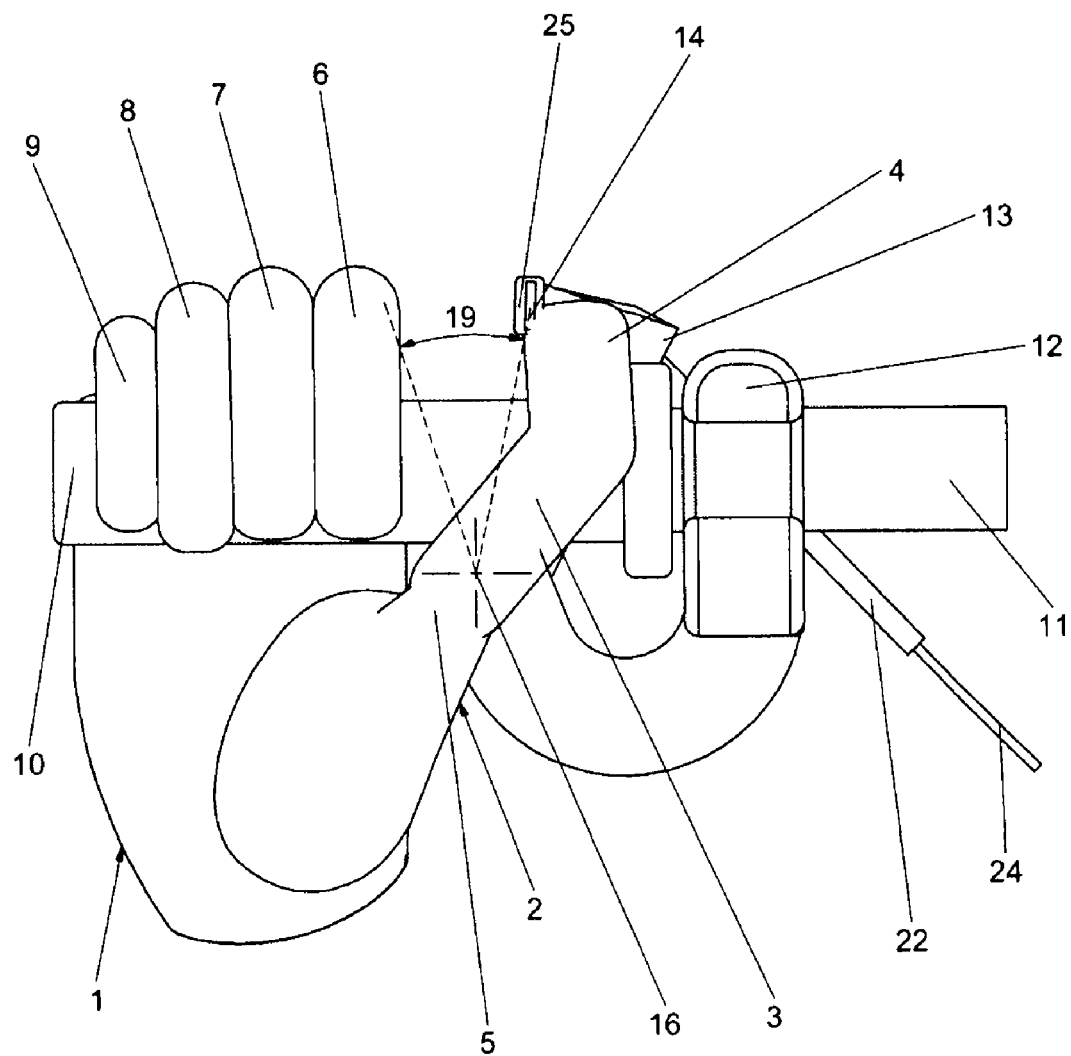
FIG. 4 is a bottom view of the first embodiment in the rest position.
Figure 5:
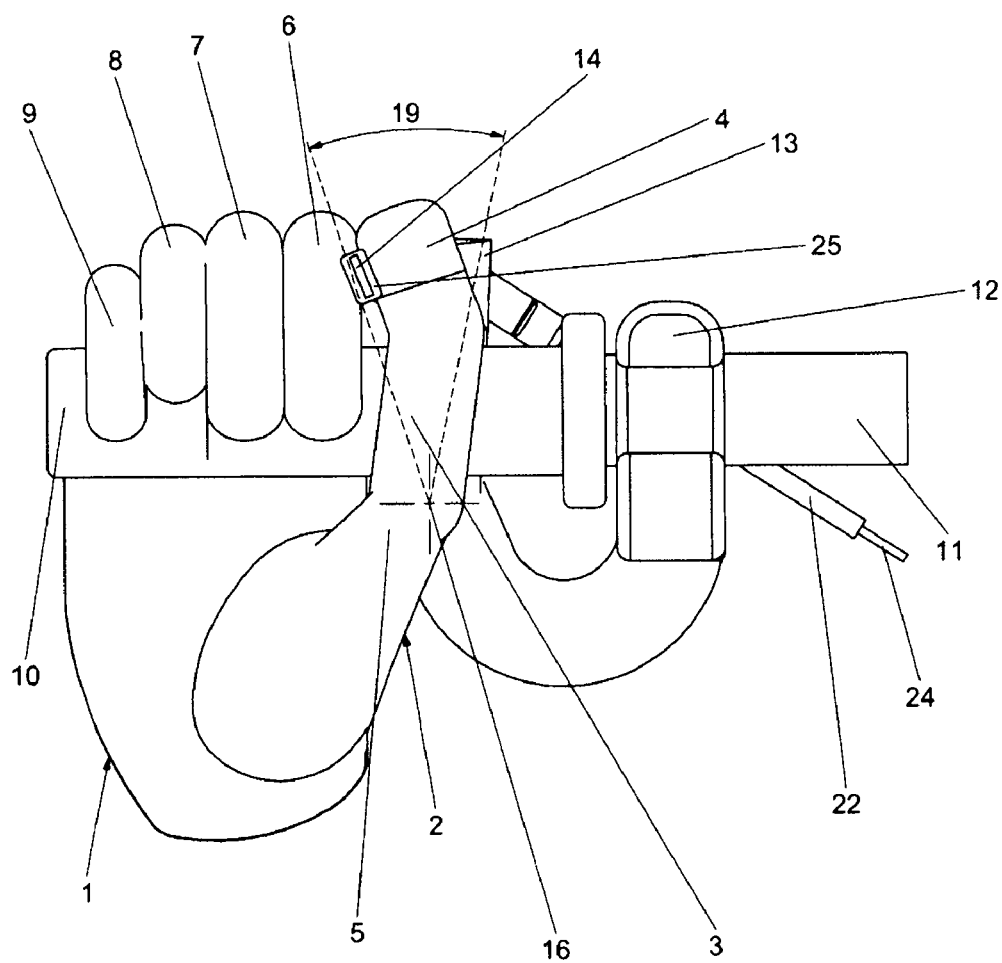
FIG. 5 is a top view of the first embodiment in the actuation position at maximum travel.

As illustrated in FIGS. 4 and 5, the physiological movement of the proximal phalanx 3 and the distal phalanx 4 is physically limited by the complete closure of the fist and the stopping of the distal phalanx 4 against the index finger. The trigger is then trapped between the upper face of the index finger 6 and the internal face of the thumb. The trigger stop 41 makes it possible to place the position of the end of the actuation so as not to achieve contact between the trigger 13 and the index finger 6 (FIG. 5).

The inclination A of the axis of rotation 16 makes it possible to adapt the movement of the trigger 13 to the preferences of the user. Once the position of the axis of rotation 16 of the trigger 13 has been set, the control action is generated by closing the thumb onto the other digits while keeping the proximal phalanx 3 of the thumb 2 resting on the handle 10. In closing, the thumb moves the proximal phalanx 3 which slides beneath the handle 10. The distal phalanx 4 pushes the end 25 of the trigger 13. It is this movement of the trigger 13 that is used as the action to control the controlled system.

It is also possible to add to the handle 10 an arrestor between the trigger 13 and the index finger 6 in order to prevent the trigger 13 crushing the index finger 6 during the complete closure of the thumb. It is also possible to protect the index finger 6 by incorporating an arrestor on the axis of rotation of the trigger 13.

The device has not only the advantage of allowing a good grasp of the handle while making it possible to control a control action sensitively and without fatigue, but also the advantage of allowing, during the intensification of the control action, the optimization and increasing of the grasp. Specifically, the more the control is actuated, the more the thumb can close up to a limit defined by the complete closure of the fist which corresponds to the ideal grasp of the handle. This feature of the device is very advantageous because it differentiates it from most of the known handle control devices which cause the grasp to reduce when the control action is intensified. As an example, if the device is used as an accelerator on a motorcycle, the more the user accelerates, the faster the user goes and the more the grasp of the handle is optimized. As another example, if the device is used as a brake on a motorcycle or an all-terrain vehicle, the greater the braking, the greater the deceleration, the greater the force in the arm associated with the deceleration increases and the more the grasp of the handle is optimized. This feature allows a considerable improvement in safety and performance which is the opposite of the known devices.

The device also has an advantage in terms of safety because it does not block or trap any fingers during gripping and the control action. In an emergency situation, it is therefore possible easily and quickly to release the handle without fearing that a finger remains trapped by the control.

Figure 6:
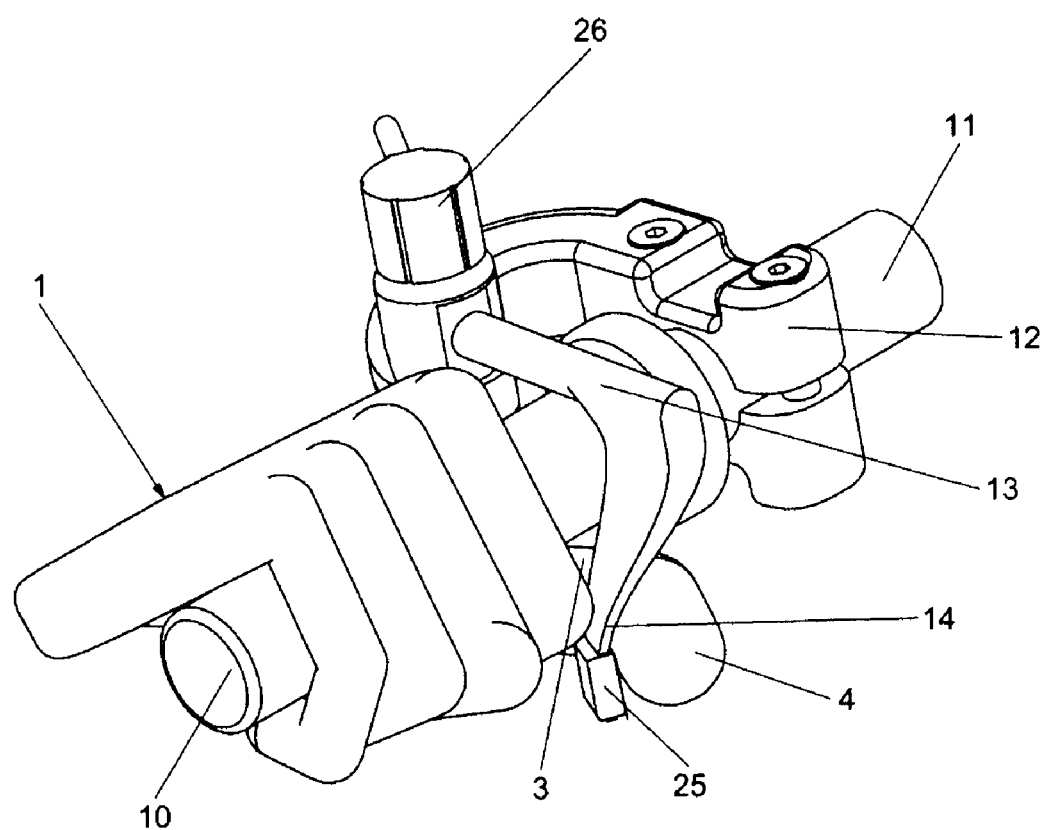
FIG. 6 represents in perspective a variant of the first embodiment with a rotation sensor.
Figure 7:
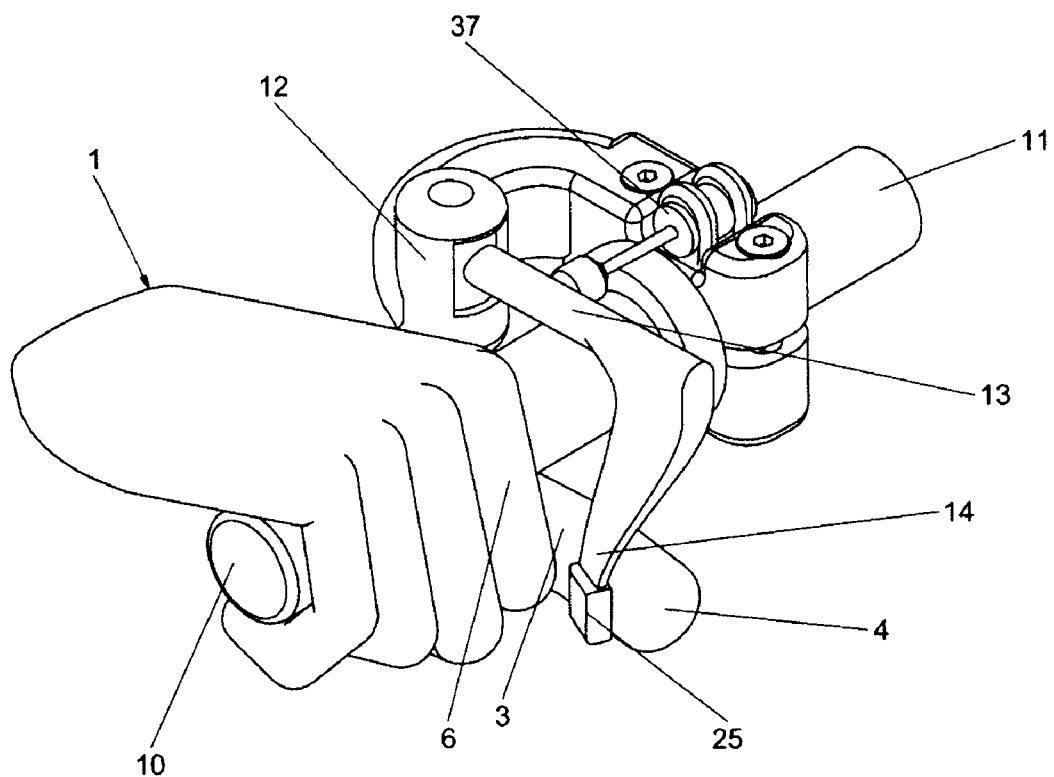
FIG. 7 represents in perspective a variant of the first embodiment with a position sensor.

In the variants illustrated in FIGS. 6 and 7, a rotary position sensor 26 is placed on the virtual axis of rotation 16. It is fixed to the trigger support 12 and supplies information on the position of the trigger 13 to a real time system in order to operate a controlled system.

The position sensor 26 may be of several types and of various technologies. As an example and in a nonexhaustive manner, it may be a sensor 26 (FIG. 6) of the rotation of the trigger 13 or a linear movement sensor 37 (FIG. 7). These sensors may be normal position sensors, sensors with or without contact.

It is possible to use one or more sensors which may be sensors of the position of the end 14 of the trigger 13 or sensors of the force on this end 14. This or these sensors supply one or more items of information to the real time system which uses them to generate the setpoint. This setpoint may be limited to the position of the trigger but may also be a complex combination of several items of information originating from various sensors or systems that are not necessarily mounted on the trigger.

As an example, to operate a throttle valve of a heat engine, it is possible to use the position of the trigger, or of its end, to generate the setpoint. But this setpoint does not have to be limited to this position only. It may be a combination of this position, of another idle speed setpoint, of a temperature correction, etc.

Then the real time system, thanks to this setpoint, carries out the position control of an electric actuator to which the throttle valve or a hydraulic valve, a brake system, a clutch system or an electric motor is attached. This control may also be used in a nonlinear manner such as for carrying out a ratio change for example.

Figure 8:
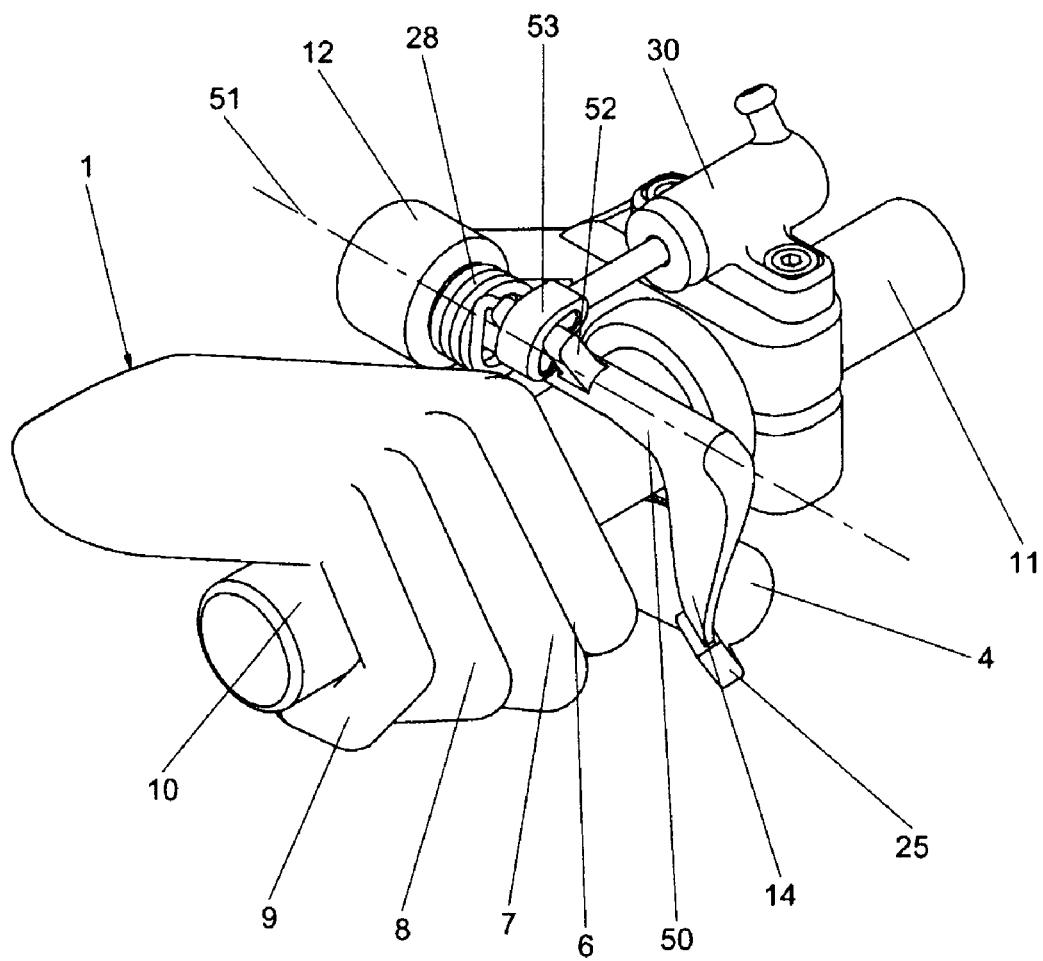
FIG. 8 represents in perspective a second embodiment with an axis of rotation in the rest position substantially parallel to the reference plane.

With the aid of FIGS. 8 to 10, the second embodiment will now be described. A trigger 50 is attached to the trigger support 12 and can be moved in rotation about an axis 51.

Figure 9:
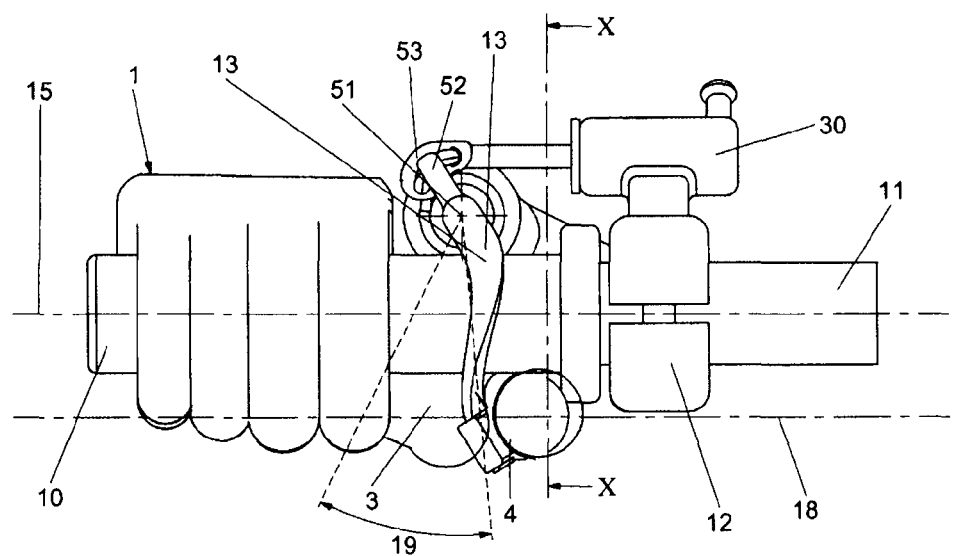
FIG. 9 is a front view of the second embodiment in the rest position.
Figure 10:
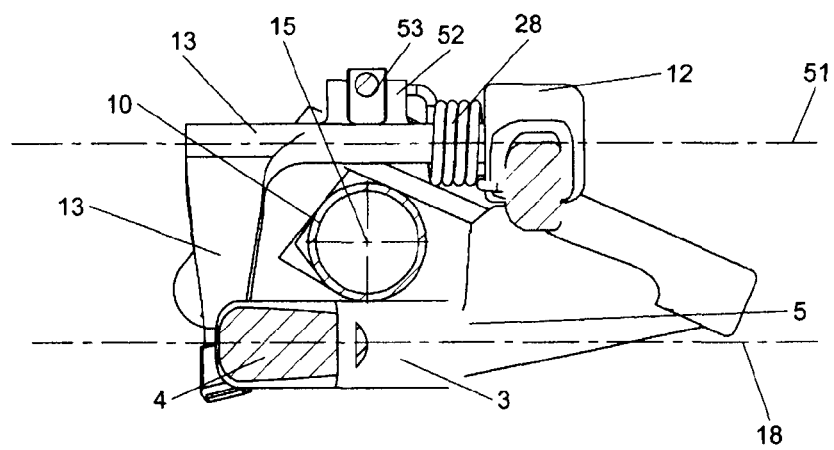
FIG. 10 is a cross section of the second embodiment.

As illustrated in FIGS. 9 and 10, the axis of rotation 51 is no longer close to the normal 45 to the reference plane 18 as in the first embodiment, but substantially parallel to the latter. A return system 28 allows the trigger 13 to return to a rest position.

The return means 28 comprises a spring bearing on a protrusion 52 at a point distant from the axis of rotation 51. A connecting part 53 connects the protrusion 52 to a piston 30 which, during a travel 19, will generate a pressure in order to operate the controlled system. The proximal phalanx/distal phalanx reference plane 18 is in this instance substantially parallel to the axis 15 of the handle.

It is also possible to use another type of return system, such as for example a hydraulic or pneumatic system which does not necessarily use a spring to allow this return of the trigger to the rest position. In the case of a controlled system incorporating a return system and comprising a mechanical connection between the trigger and the controlled system, it is optionally possible to dispense with this return system on the trigger and to use only that of the controlled system. If the trigger can be moved and operates the controlled system via a real time system with no mechanical connection with the controlled system, the device incorporates a return system. This makes it possible to manage the force via the thumb. The system creates a reaction force to that of the thumb which makes it possible to meter the control action better.

A linear position sensor 30 is placed between the trigger 13 and the trigger support 12 to which it is attached and supplies an item of information on the position of the trigger 13 to a real time system in order to operate a controlled system.

Figure 11:
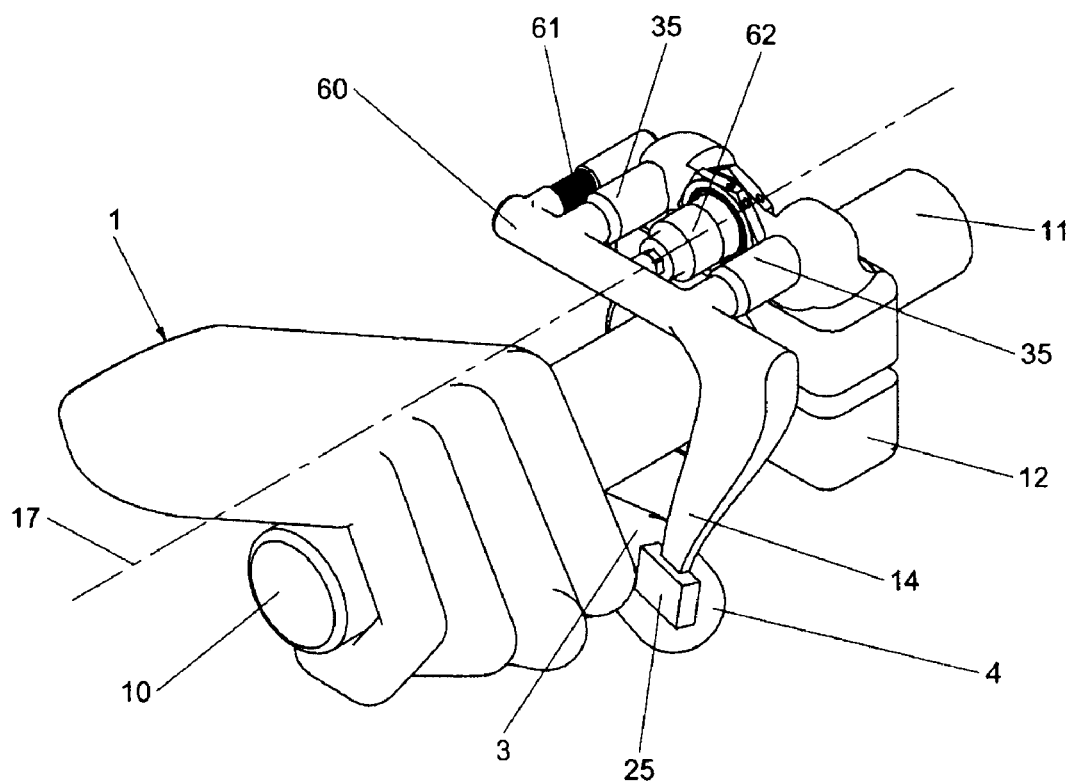
FIG. 11 represents in perspective a third embodiment with a system of translating the device in the position of maximum travel.

In the third embodiment, illustrated in FIG. 11, a trigger 60 moves in translation relative to the trigger support 12 thanks to two guides 35. The end 14 of the trigger moves parallel to the axis 15 of the handle 10.

Because of the sliding of the lateral side 44 of the proximal phalanx 3 along a bearing surface 46 of the handle 10, the internal face of the end of the distal phalanx follows the movement of the end 14 of the trigger 13 with a reduced relative sliding action. A return spring 61 is attached between the trigger 60 and the trigger support 12.

A linear position sensor 62 without contact is attached to the trigger support 12 and informs a real time system on the position of the trigger 13 so that the latter operates the controlled system.

In a variant, the movement of the trigger may very well be a combination of a rotation about an axis and a translation, described above, in order to best adapt to the preferences of the user.

Figure 12:
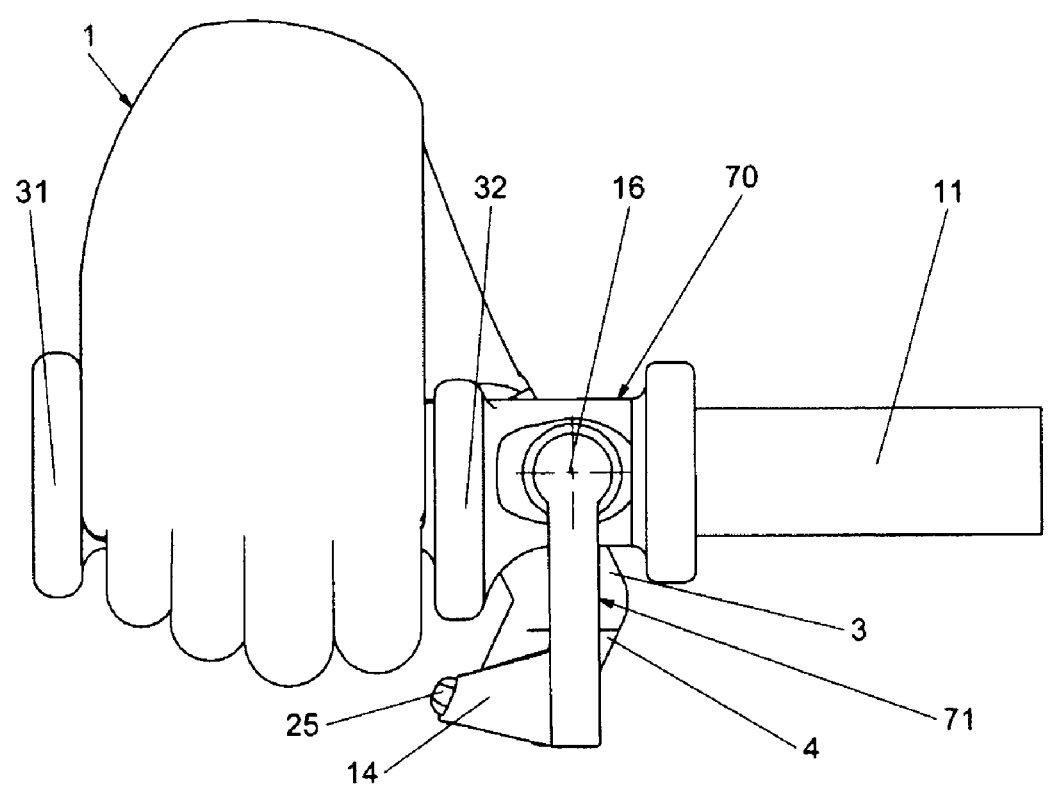
FIG. 12 represents in perspective a fourth embodiment with the trigger incorporated into the handle of the device in the position of maximum travel.

The fourth embodiment illustrated in FIG. 12 differs from the first embodiment in that it comprises a more elaborate handle 70. The handle 70 incorporates the trigger support 12. A trigger 71 is articulated about the axis 16. The handle 70 is also furnished with an external hand arrestor 31 and with an internal hand arrestor 32 in order to allow the longitudinal positioning of the hand.

Figure 13:
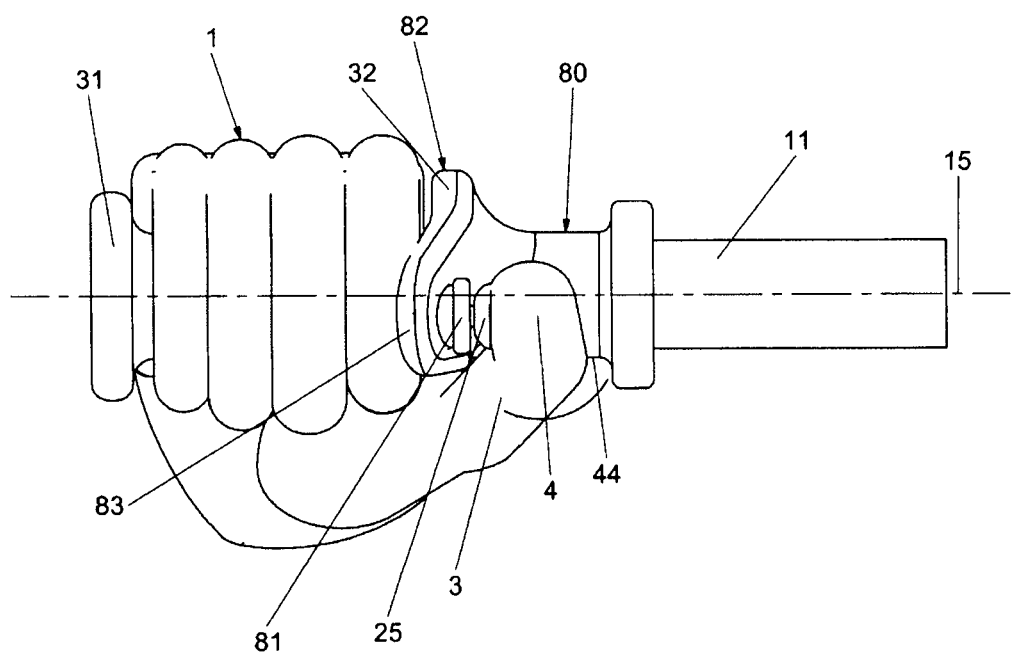
FIG. 13 represents in a front view a fifth embodiment with a trigger fixed and incorporated into the handle of the device.

In the fifth embodiment illustrated in FIG. 13, the trigger 13 is fixed relative to a handle 80. A force sensor 81, furnished with a pressure part 25, is placed on the trigger end 14. Adjustment systems 36 are incorporated into the trigger support 12 in order to allow the ergonomic positioning of the trigger end 14, and hence of the pressure part 25, relative to the distal phalanx 4. The distal phalanx 4 applies a pressure to the pressure part 25 which generates a force on the force sensor 27, while keeping the proximal phalanx 3 pressing on the handle 10. There is still the proximal phalanx 3 and the distal phalanx 4 which operate in the reference plane 18. The force sensor 27 will transmit the force information to a real time system so that the latter operates the controlled system.

The handle 80 also comprises prepositioning means 82. Said prepositioning means 82 comprise an internal hand arrestor 31 and/or an external hand arrestor 32. The shape of the hand arrestors 31, 32 is designed to allow the angular positioning of the hand about the axis 15 of the handle 80. The user may easily find the optimal hand position again on the occasion of each use. The prepositioning means 82 define a main grasping position.

The angular position of the hand 1 allows amongst other things the correct positioning of the distal phalanx on the end of the trigger in its rest position.

The lateral position of the hand 1 also allows amongst other things the correct positioning of the distal phalanx on the end of the trigger in its rest position.

If the trigger no longer mechanically operates the controlled system, it is possible to dispense with having a movable trigger, while retaining the fundamental principle of operation of the device, namely a constant pressure of the proximal phalanx on the handle and of the distal phalanx on the trigger end. Specifically, if the trigger is fixed, it is then possible to use the force and/or one or more items of information on this force exerted on the end of the trigger by the thumb to generate the control action. This force and/or one or more items of information on this force is/are transmitted to a sensor which supplies this information to the real time system which uses it to generate the setpoint and therefore operate the controlled system.

This information may be supplied by one or more sensors which may be of different types.

In a variant, it is possible to combine the fourth and the fifth embodiment. A trigger, similar to the trigger 71, is mounted fixedly on the handle 70 and fitted with a stress gauge measuring the deformation of the trigger.

In another variant, it is possible to modify the shape of the trigger 80 so that there is always the possibility of actuating it even if the angle of the hand on the handle is different from the angle of optimal position. It is also possible to help the angular positioning of the hand by using a handle of ergonomic shape. For example, it is possible to incorporate onto the handle a shape allowing an angular positioning of the palm, which will thereby position the hand also. In other words, in this variant, the prepositioning means 82 of the hand 1 have several grasping positions.

Figure 14:
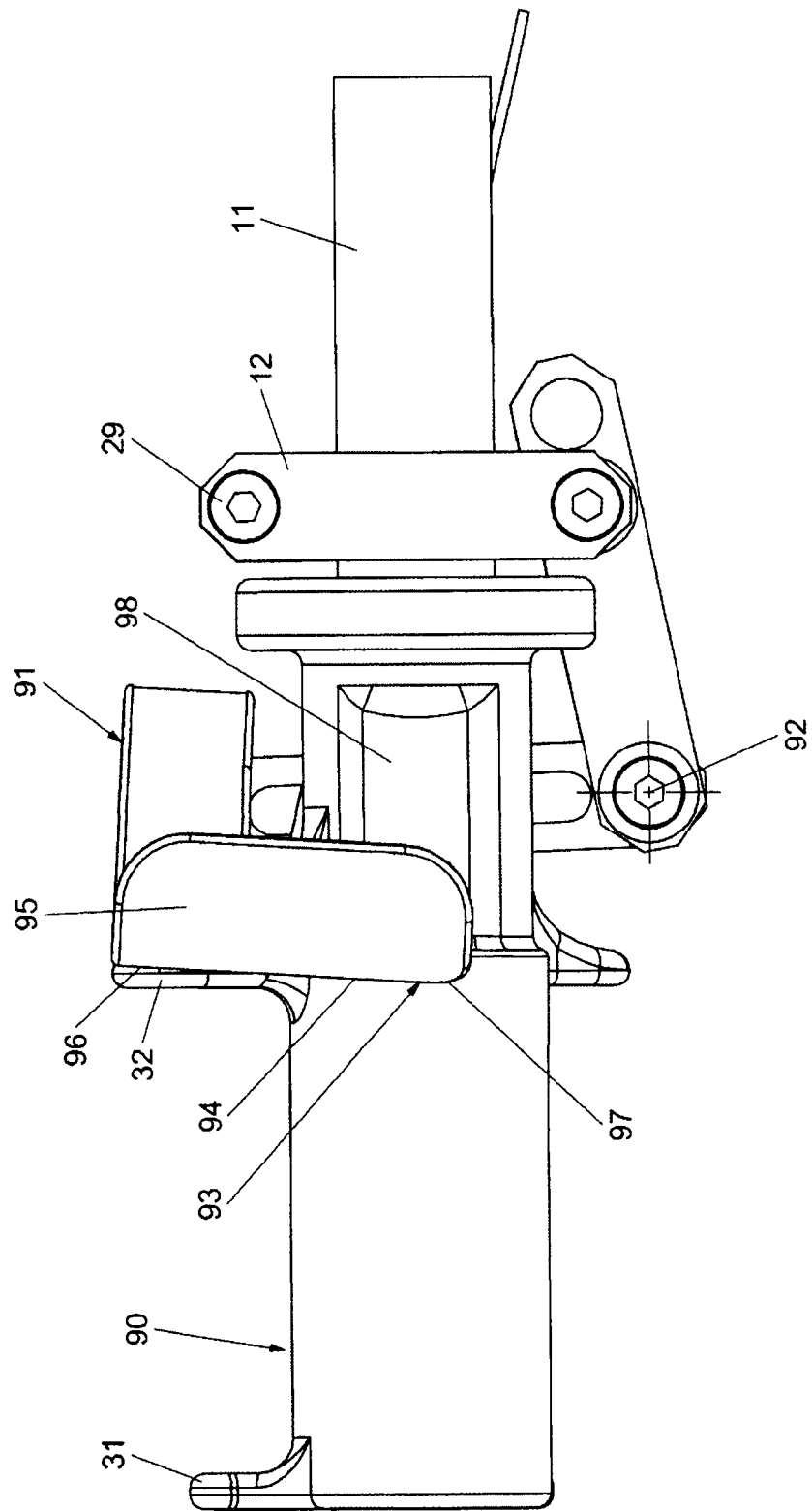
FIG. 14 is a bottom view of a sixth embodiment with a trigger furnished with an elongated pressure end.
Figure 15:
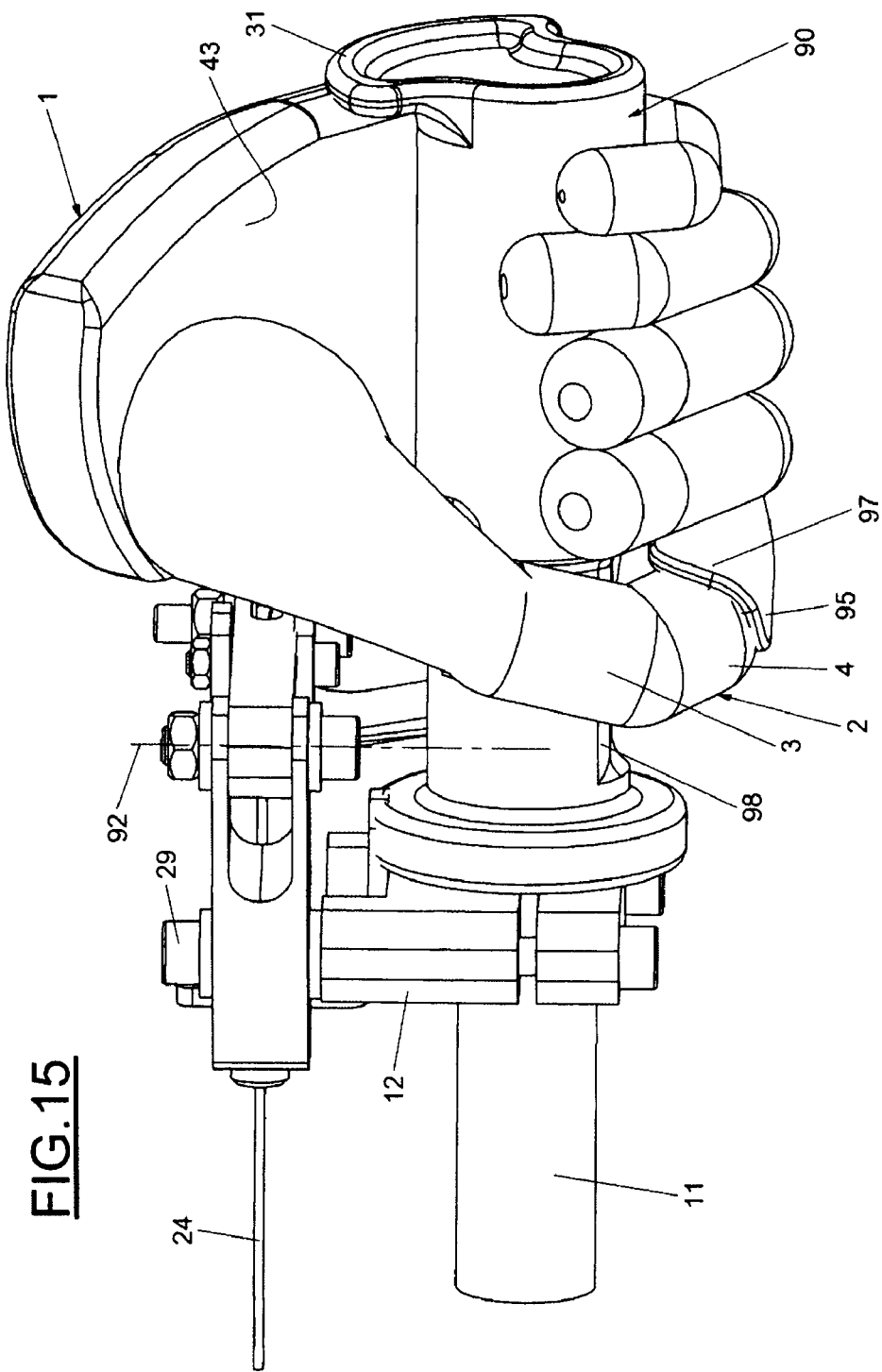
FIG. 15 is a rear view of the sixth embodiment.

The sixth embodiment illustrated in FIGS. 14 and 15 comprises a handle 90 and a trigger 91 articulated about an axis of rotation 92 oriented in a manner similar to the axis 16 of the first embodiment. The trigger 91 comprises a pressure part 93 of elongated shape and extending about the axis 15 of the handle 90. The pressure part 93 has a lateral piece 94 extending radially relative to the axis 15, and a guide piece 95 making it possible to hold the end of the distal phalanx against the lateral piece 94.

The pressure part 93 has a front end 96 designed to be pushed by the distal phalanx 4 when the hand 1 is in a main grasping position. The pressure part 93 also has a rear end 97 allowing the distal phalanx 4 to press on the trigger 90 when the hand 1 is in an extreme grasping position illustrated in FIG. 15. This grasping position may correspond for example to a standing position of a rider of a jet ski. In this extreme grasping position, the proximal phalanx 3 of the thumb 2 remains in contact with the handle 90.

The handle 90 also has a main bearing flat 98 designed to receive the proximal phalanx 3 of the thumb 2 when the hand 1 is in the main grasping position.

According to a variant not illustrated, the trigger may consist of several parts.

According to a variant not illustrated, the trigger may be placed beneath the handle and come into contact with the distal phalanx of the thumb underneath.

According to a variant not illustrated, it is possible to incorporate several control devices on one and the same handle. It is possible for example to have on one and the same handle one trigger controlling the throttle and one controlling the brake.

According to a variant not illustrated, a system of grooves may allow the positioning of the handle on the handle support.

According to a variant not illustrated, the handle may have a cross section of any shape and not constant along its axis.

According to a variant not illustrated, a hand protector may be incorporated into the handle.

The device according to the invention is more particularly designed for machines fitted with controls coupled to handles requiring a considerable grip, such as vehicles fitted with handles (motorcycles, boats, quad bikes, snowmobiles, jet skis or all-terrain vehicles, etc.) or portable tools (brush cutters, hand drills, pneumatic drills, etc.).

The invention claimed is:

1. A manual control device comprising:
   a handle extending along a handle axis;
   a trigger mobile in rotation about a trigger axis with respect to the handle;
   a pressure part disposed at an end of the trigger, wherein the pressure part has an actuation surface centered on an actuation surface center, which receives a thumb of a hand grasping the handle;
   a first trigger stop delimiting trigger rotation in a first direction;
   a first trigger position defined by delimiting contact between the trigger and the first trigger stop;
   a second trigger stop delimiting trigger rotation in a second direction;
   a second trigger position defined by delimiting contact between the trigger and the second trigger stop;
   a first reference plane including the handle axis and extending parallel to the trigger axis;
   a second reference plane including the trigger axis and extending perpendicular to the first reference plane;
   a handle cross point defined by the intersection of the handle axis and the second reference plane;
   a first normal plane extending perpendicular to the handle axis and including the actuation surface center when the trigger is in the first trigger position; and
   a second normal plane extending perpendicular to the handle axis and including the actuation surface center when the trigger is in the second trigger position,
   wherein the handle cross point is located between the first normal plane and the second normal plane.

2. The device as claimed in claim 1, further comprising:
   grasping prepositioning means, such that a proximal phalanx/distal phalanx reference plane has a gripping angle relative to the axis of the handle that is less than 25 degrees.

3. The device as claimed in claim 1, further comprising:
   grasping prepositioning means having a palm reception surface that receives a metacarpal palm, the palm reception surface having a midplane that is substantially parallel to the axis of the handle.

4. The device as claimed in claim 1, wherein the trigger comprises a thrust part extending around the handle so that, in plural grasping positions, an end of a distal phalanx of the thumb of the hand grasping the handle is opposite the pressure part.

5. The device as claimed in claim 1, wherein the handle includes a substantially flat bearing zone configured to receive a proximal phalanx of the thumb of the hand grasping the handle during the control action.

6. The device as claimed in claim 1, wherein
the first trigger position is a rest position,
the second trigger position is an extreme actuation position, and
the trigger is movable between the rest position and the extreme actuation position.

7. The device as claimed in claim 6, wherein the second trigger stop is located such that the extreme actuation position of the trigger is limited by complete closure of a fist of the hand gripping the handle and resting of the trigger on an index finger of the hand gripping the handle.

8. The device as claimed in claim 1, wherein
a location of the actuation surface center corresponding to the first trigger position and a location of the actuation surface center corresponding to the second trigger position define an arc of a first circle along which the actuation surface center is subjected to move, and
the trigger rotation axis is situated so that the arc of the first circle is identical to an arc of a second circle defined by motion of the distal phalanx all along the control action.

9. The device as claimed in claim 1, further comprising:
a return system that urges the trigger toward the first trigger position.

10. The device as claimed in claim 1, wherein the handle includes an external hand arrestor, or an internal hand arrestor, or both the external hand arrestor and the internal hand arrestor.

11. The device as claimed in claim 1, further comprising;
at least one control setpoint generator taken from a mechanical connecting part, an analog or digital sensor of a position of the trigger, or an analog or digital sensor of a force exerted on the trigger.

12. A machine fitted with the device as claimed in claim 1, wherein the pressure part of the trigger is situated at least partly in front of the handle in a horizontal direction.

13. A method for grasping a machine and simultaneously controlling at least one system for controlling the machine using a manual control device as claimed in claim 1, comprising:
grasping the machine with all fingers of the hand on the handle during actuation of the control device with the thumb of the same hand.

14. The manual control device as claimed in claim 1, wherein,
the first trigger position locates the pressure part on a first side of the second reference plane, and
the second trigger position locates the pressure part on a second side of the second reference plane opposite the first side of the second reference plane.

15. The manual control device as claimed in claim 1, wherein
a first line is defined by an intersection of the first reference plane and the second reference plane, and
an angle formed between the first line and the handle axis is 90 degrees.

16. The manual control device as claimed in claim 1, further comprising:
a return system that urges the trigger against the first trigger stop, wherein
a rest position of the actuation surface center is defined by a position of the actuation surface center when the trigger contacts the first trigger stop,
the second trigger stop is an extreme actuation trigger stop,
an extreme actuation position of the actuation surface center is defined by a position of the actuation surface center when the trigger contacts the second trigger stop,
the trigger axis is located on a first side of the first reference plane, and
the extreme actuation position of the actuation surface center is located on a second side of the first reference plane, opposite the first side of the first reference plane.

* * * * *